(12) United States Patent
Khubani

(10) Patent No.: US 11,746,932 B2
(45) Date of Patent: Sep. 5, 2023

(54) EXPANDABLE AND RETRACTABLE HOSE REINFORCED WITH HEMP

(71) Applicant: Hempvana, LLC, Miami Beach, FL (US)

(72) Inventor: Ajit Khubani, Saddle River, NJ (US)

(73) Assignee: HEMPVANA, LLC, Miami Beach, FL (US)

(*) Notice: Subject to any disclaimer, the term of this patent is extended or adjusted under 35 U.S.C. 154(b) by 0 days.

(21) Appl. No.: 17/365,237

(22) Filed: Jul. 1, 2021

(65) Prior Publication Data
US 2022/0003339 A1 Jan. 6, 2022

Related U.S. Application Data

(60) Provisional application No. 63/047,829, filed on Jul. 2, 2020.

(51) Int. Cl.
*F16L 11/02* (2006.01)
*F16L 11/08* (2006.01)
*F16L 11/11* (2006.01)
*B32B 1/08* (2006.01)
*B32B 5/02* (2006.01)

(52) U.S. Cl.
CPC ............ *F16L 11/02* (2013.01); *B32B 1/08* (2013.01); *B32B 5/02* (2013.01); *F16L 11/08* (2013.01); *F16L 11/11* (2013.01); *B32B 2307/51* (2013.01); *B32B 2307/552* (2013.01); *B32B 2307/558* (2013.01); *B32B 2307/758* (2013.01); *B32B 2597/00* (2013.01)

(58) Field of Classification Search
CPC . F16L 11/02; F16L 11/08; F16L 11/11; B32B 1/08; B32B 5/02; B32B 2307/51; B32B 2307/552; B32B 2307/558; B32B 2307/758; B32B 2597/00
See application file for complete search history.

(56) References Cited

U.S. PATENT DOCUMENTS

| | | | |
|---|---|---|---|
| 4,023,835 A * | 5/1977 | Ewing | F16L 21/005 285/305 |
| 6,197,823 B1 | 3/2001 | Barr et al. | |
| 6,653,352 B2 | 11/2003 | Barr et al. | |
| 7,267,141 B1 * | 9/2007 | De Meyer | F16L 1/038 425/62 |
| 9,321,765 B2 | 4/2016 | Gong | |
| 9,709,194 B1 | 7/2017 | Pan | |
| 10,111,985 B2 | 10/2018 | Askari et al. | |
| 10,174,870 B2 | 1/2019 | Berardi | |
| 10,189,773 B2 | 1/2019 | Askari et al. | |
| 10,668,044 B2 | 6/2020 | Muscarella | |
| 10,806,790 B1 | 10/2020 | Shapiro | |
| 2013/0000767 A1 * | 1/2013 | Nonaka | B29C 70/026 156/123 |

(Continued)

*Primary Examiner* — Craig M Schneider
*Assistant Examiner* — David R Deal
(74) *Attorney, Agent, or Firm* — Kelley Drye & Warren LLP

(57) ABSTRACT

Hemp fibers may be disposed throughout or in selected portions of a hose (e.g., an expandable water hose). The hemp fibers deployed in the hose enhance the durability of the hose, and imparts various advantageous properties (e.g., anti-microbial or anti-bacterial, mildew-resistant, odor reduction, moisture wicking, etc.) to the hose.

11 Claims, 4 Drawing Sheets

(56) References Cited

U.S. PATENT DOCUMENTS

| | | | | |
|---|---|---|---|---|
| 2013/0019982 A1* | 1/2013 | Kobayashi | .......... | F16L 55/1656 |
| | | | | 138/97 |
| 2015/0249330 A1* | 9/2015 | Hepfinger | ............ | H02G 3/0481 |
| | | | | 138/111 |
| 2015/0285423 A1* | 10/2015 | Bureau | ............... | F16L 55/1656 |
| | | | | 138/97 |
| 2015/0337996 A1* | 11/2015 | Bennett | .................. | F16L 11/10 |
| | | | | 138/137 |
| 2020/0208759 A1* | 7/2020 | Iaciofano | ................. | D03D 3/02 |
| 2022/0162433 A1* | 5/2022 | Burrowes | ............. | B32B 25/042 |

* cited by examiner

EXPANDABLE AND RETRACTABLE HOSE REINFORCED WITH HEMP

RELATED APPLICATIONS

This application claims priority under 35 U.S.C. § 119(e) to U.S. Provisional Application No. 63/047,829, filed Jul. 2, 2020, which is hereby incorporated by reference in its entirety.

TECHNICAL FIELD

This disclosure relates to water hoses, such as hoses that are configured to elongate when pressurized and to retract when the pressure is decreased.

BACKGROUND

Hoses are commonly used for delivering fluids from one place to another. Garden hoses in particular are popular for providing water to where it is needed (e.g., watering lawn, washing car, spraying down patio, running sprinkler for children, etc.). However, long conventional hoses may be troublesome to manipulate and store. The length of a conventional hose is typically fixed, whether in use or in storage. Reels and hooks are conventionally employed in hose storage solutions, but many users find such arrangements to be too unwieldy and cumbersome, and simply leave the hose in disarray on the ground when not in use, leading to aggregation of kinks and knots in such improperly stowed hoses, which can result over time in premature failure when used.

SUMMARY

The properties of a hose, such as an expandable hose (i.e. hose that is configured to elongate when pressurized and to retract when the pressure is decreased), can be improved or enhanced by dispersing hemp fibers in, or weaving hemp fibers into, a material of the hose. Since the typical user prefers that the hose is easy to handle, and hemp fibers naturally hold their shape and stretch less than other natural fibers, it would be counterintuitive to employ them in a hose, as they would not be expected to contribute to the flexibility. However, the inventor determined that it would nevertheless be advantageous to employ hemp fibers in a hose. For example, the superior tensile strength of hemp fibers enables a hose to have improved durability. Further, the porous structure of hemp fibers permits them to impart to a hose other desirable properties, such as moisture wicking, anti-microbial or anti-bacterial, mildew-resistant, odor reduction, etc.

Hemp fibers can be dispersed throughout a material of a hose. On the other hand, in some exemplary embodiments, an expandable hose can be constituted such that a density of hemp fibers dispersed in, or woven into a material of, some portions of the hose is greater than that in other areas of the hose, such that the advantageous properties are particularly enhanced in said portions of the hose having higher density of hemp fibers. In other embodiments, hemp fibers are dispersed in, or woven into a material of, some portions of the hose, and no hemp fibers are dispersed in, or woven into a material of, other portions of the hose.

BRIEF DESCRIPTION OF THE DRAWINGS

The aforementioned and other aspects, features and advantages can be more readily understood from the following detailed description with reference to the accompanying drawings, wherein.

DETAILED DESCRIPTION

Figure 2:
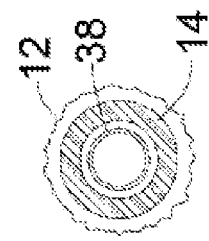
FIG. 2 shows a cross section view of the hose taken along line 2-2 in FIG. 1.

Exemplary embodiments of novel hoses incorporating fibers from the Cannabis hemp plant are discussed herein. In a preferred embodiment, an expandable hose is adapted by dispersing hemp fibers in, or weaving hemp fibers into, a material of the hose (or part of the hose, e.g., one or more layers of a multi-layer hose). An expandable hose can expand to 3 times its length once the water is turned on, and once the water is turned off the water, such a self-draining hose may return to their original length, and thus such hose is much easier to store, as compared to a conventional rubber hose. Further, an expandable hose does not typically kink or get tangled, as rubber hoses might tend to do.

According to certain exemplary embodiments, hoses can be constructed of one or more of cotton, spandex, neoprene, polyester, and include fibers from the hemp plant. According to certain exemplary embodiments, hoses can be constructed of a combination of cotton, spandex, and hemp fibers. In a preferred embodiment, the hose can be constructed of 80% cotton, 11% spandex, and 9% hemp fibers. According to certain exemplary embodiments, hoses can be constructed of polyester and hemp fibers.

Hemp is an extremely fast-growing crop, making it an environmentally friendly crop having many possible uses. Hemp fibers hold their shape, stretching less than other natural fibers, and therefore typically would not be intuitively considered to be used as a material for, for example, expandable hoses, as it would not deemed as contributing to the flexibility of the hose. However, the inventor found that there are many benefits to using hemp fibers in a hose. For example, while hoses, in use, experience much wear and tear, such effects can be alleviated by employing hemp fibers in the material of an expandable hose, since hemp fibers are one of the most durable fibers and also have incredible tensile strength (that is higher than those of, e.g., steel and nylon). Additionally, hemp fibers are porous, giving hoses that employ hemp fibers a moisture wicking property, so that there is less of a tendency for water to remain in the hose when not in use. Further, hemp fibers naturally impart anti-microbial or anti-bacterial properties, as well as mildew-resistant properties, to the hose, as well as reduce odor in the hose. Also, the more the hose is used, the softer hemp fiber becomes, while maintaining high tensile strength.

Expandable (e.g., elongatable and retractable) hoses are described herein, with reference to examples and exemplary embodiments. Specific terminology is employed in describing examples and exemplary embodiments. However, the disclosure of this patent specification is not intended to be limited to the specific terminology so selected and it is to be understood that each specific element includes all technical equivalents that operate in a similar manner.

An exemplary embodiment of a hose that can be adapted to include hemp fibers embodied in at least a portion of the hose will not be explained with reference to FIGS. 1-6.

Figure 1:
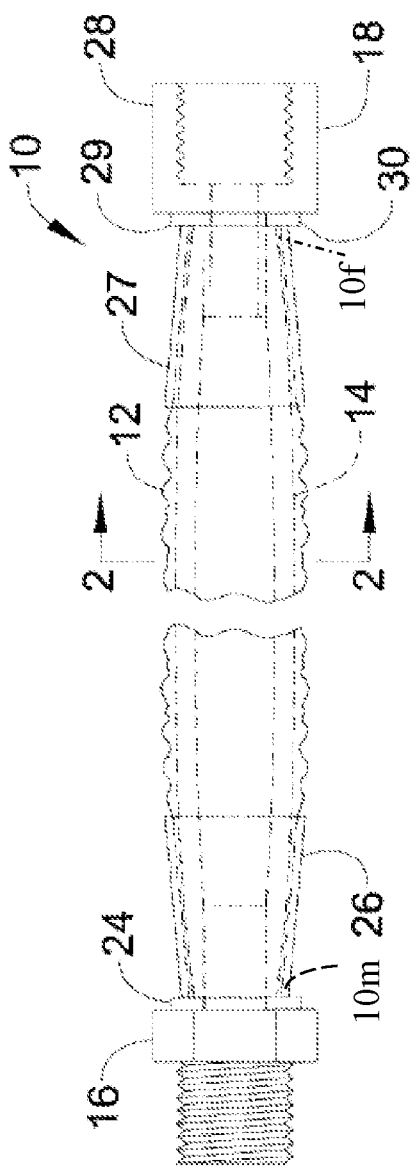
FIG. 1 shows a longitudinal side view of a hose in a contracted position, according to an exemplary embodiment.
Figure 4:
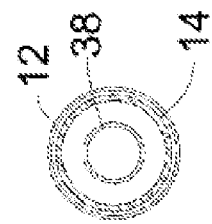
FIG. 4 shows a cross sectional view of the hose taken along line 4-4 in FIG. 3.
Figure 3:
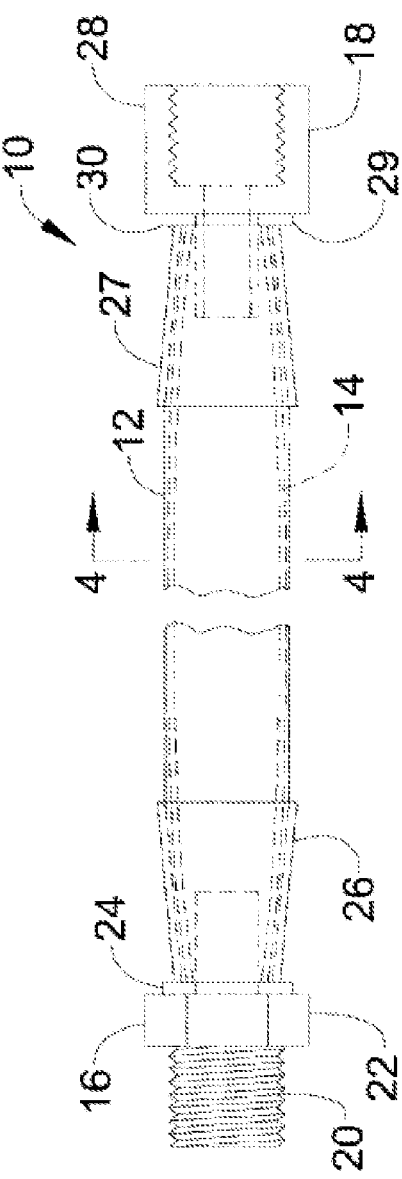
FIG. 3 shows a longitudinal view of the hose in an expanded position.

FIGS. 1 and 3 illustrate an expandable hose 10 that is self-expanding upon application of a pressurized liquid and increased fluid volume within the hose and that is also self-contracting upon release of the pressurized liquid and fluid volume from within the hose. The hose 10 includes outer tube (or layer) 12 and inner tube (or layer) 14.

Figure 5:
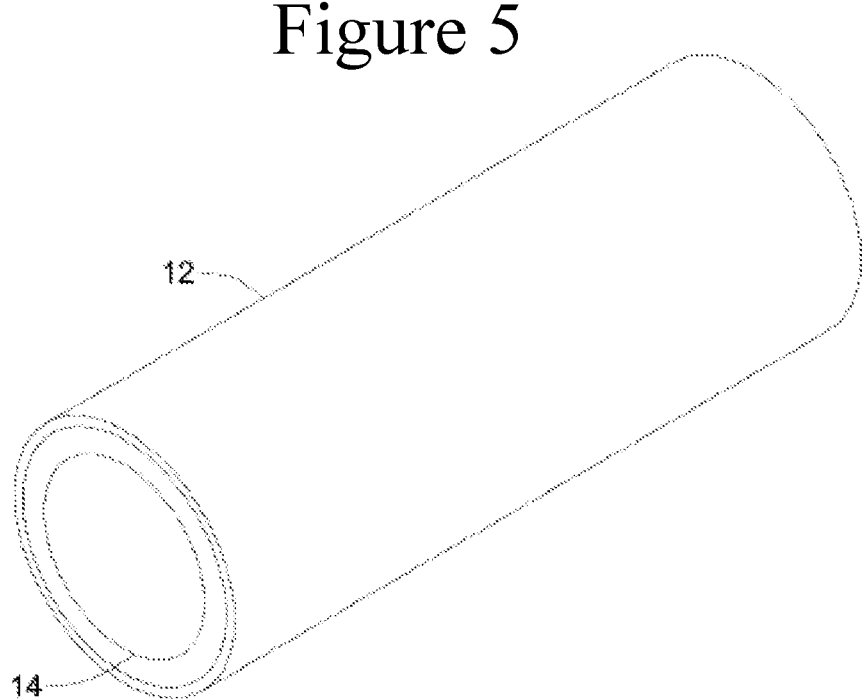
FIG. 5 shows a cross sectional view, perspective view of a section of the hose taken along line 4-4 in FIG. 3.
Figure 6:
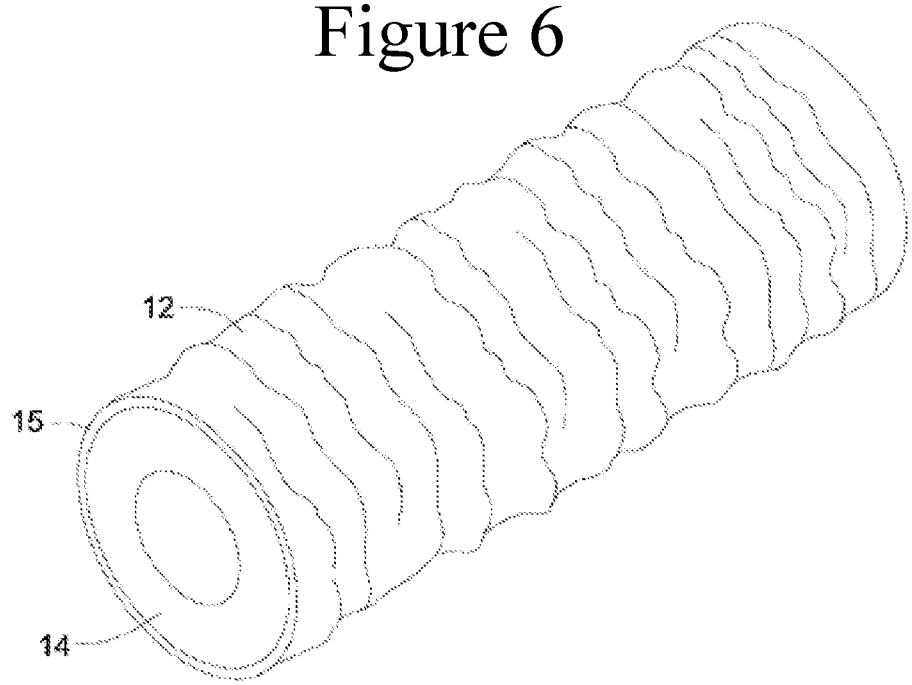
FIG. 6 shows a cross sectional view, perspective view of a section of the hose of the present invention taken along line 2-2 in FIG. 1.

The hose 10 is illustrated in its contracted condition in FIGS. 1, 2 and 6. In this condition, the elastic inner tube 14 is in a relaxed contracted condition wherein there are little or no forces being applied to the inner tube 14 to expand or stretch it, and the outer tube 12 is not in contact with the inner tube 14 when the hose is in this contracted condition. That is, there is a space 15 (FIG. 6) between the inner tube 14 and the outer tube 12, and as illustrated, the thickness of the wall of the inner tube 14 in the contracted position (FIG. 5) is relatively large compared to the thickness of the inner tube 14 in the expanded position (FIG. 5). The expansion of the elastic inner tube 14 laterally is the result of an increase in the pressure and volume of the liquid within the inner tube 14, which also results in expansion of the length of the elastic inner tube 14. Such expansion of the inner tube 14, both laterally and longitudinally, results in a decrease in the wall thickness of the inner tube, an increase in the diameter of the inner tube thus increasing the volume of liquid that can flow through the inner tube 14. As illustrated in FIG. 5, the inside diameter of the inner tube is expanded and extended because of an increase of the pressurized liquid and volume within the inner tube 14.

The inner tube 14 can be formed from a material that is elastic with an elongation ratio that enables the hose to expand up to 4 to 6 times its relaxed or unexpanded length when a pressurized liquid is introduced into the elastic inner tube 14. For example, synthetic materials that have elastic properties permitting the hose, with hemp fibers embedded or dispersed in such material, to automatically retract from a stretched or expanded state can also be used. In such arrangement, upon application of pressurized liquid into the inner tube, the elastic inner tube 14 expands radially outwardly or laterally, with respect to its length, within the outer tube.

In certain exemplary embodiments, by dispersing hemp fibers are dispersed in a material of the inner tube 14, to impart to the inner tube 14 the desirable properties of being moisture wicking, anti-microbial or anti-bacterial, mildew-resistant, odor reduction, etc.

The outer tube 12 is formed from a non-elastic, but relatively soft, bendable, tubular webbing material, preferably a non-elastic, soft tubular webbing made from a strong braided or woven nylon, polyester, or polypropylene fabric or any other tubular braided of woven, non-elastic fabric, with hemp fibers embedded therein or woven thereinto, and which can withstand an internal pressure of up to 250 psi. For example, the materials used to form the non-elastic outer tube 12 may be braided or woven nylon, polyester, or polypropylene, optionally with hemp fibers embedded therein. Other braided or woven materials can also be employed to form the outer tube 12. The material of the outer tube 12 should preferably be strong enough to withstand internal pressures of up to 250 pounds per square inch (psi).

In another exemplary embodiment, hemp fibers are dispersed in, or selectively woven into, the webbing material of the outer tube 12, to enhance tensile strength of the outer tube 12 and render it more resistant to wear and tear.

The hose 10 can additionally include a female coupler 18 at a first end thereof and a male coupler 16 at a second end thereof, where the male coupler 16 includes a threaded portion 20, a mid-portion 22, and a portion 24 onto which are secured the inner tube 14, the outer tube 12, and an expansion restrictor sleeve 26. The female coupler 18 includes a threaded portion 28 on the interior of the female coupler, with the inner tube 14, the outer tube 12, and an expansion restrictor sleeve 27 secured to the female coupler 18. The threaded portion 28 is constructed to receive the male threads 20 and enable coupling of one hose to another, or to couple to a standard size male coupler or fitting typically provided on a faucet or a water outlet. The female coupler 18 can also include a washer 29 which helps to provide a fluid tight connection between the male and female couplers or any other male or female coupler.

The non-elastic outer tube 12 is attached and connected to the inner tube 14 only at interfacial areas 10f and 10m of the respective first and second ends of the hose by the female coupler 18 and the male coupler 16, respectively. The outer tube 12 is unattached, unconnected, unbonded, and unsecured to the elastic inner tube 14 along the entire length of the inner tube 14, between the two couplers, and thus the outer tube 12 is able to move freely with respect to the inner tube along the entire length of the inner tube 14, between the couplers, when the hose expands or contracts.

It should be appreciated that the interfacial areas 10f and 10m of the hose 10 are more susceptible to wear and tear. In an exemplary embodiment, a density of hemp fibers dispersed in, or woven into a material of, the interfacial areas 10f and 10m of the hose may be made to be greater than that in other areas of the hose. Thus, tensile strength of the interfacial areas 10f and 10m of the hose can be enhanced and such portions of the hose can be more resistant to the wear and tear. In another exemplary embodiments, hemp fibers are dispersed in, or woven into a material of, the interfacial areas 10f and 10m of the hose, and no hemp fibers are dispersed in, or woven into a material of, other portions (e.g., near a central portion longitudinally) of the hose.

Figure 7:
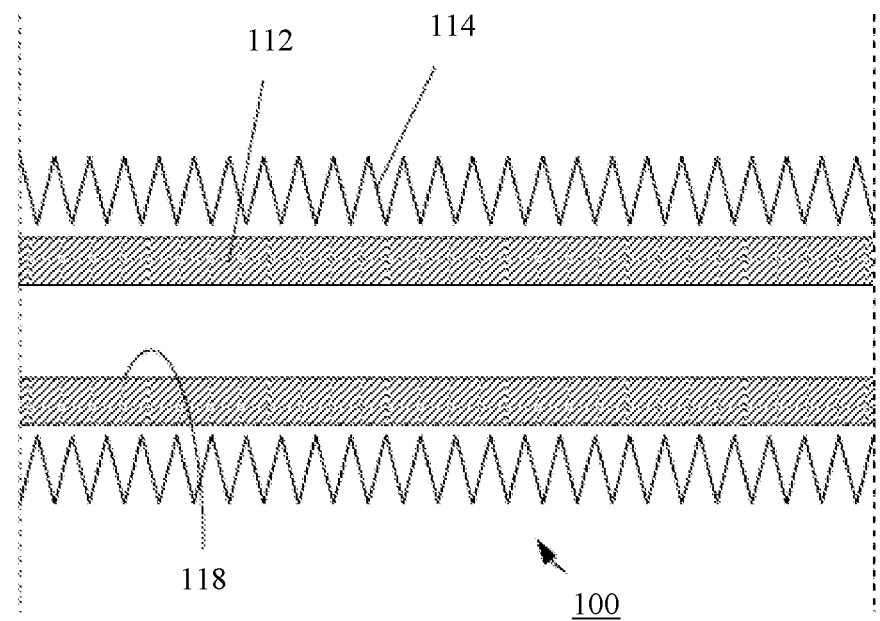
FIG. 7 shows a cross sectional view of a hose in a retracted state, according to another exemplary embodiment.
Figure 8:
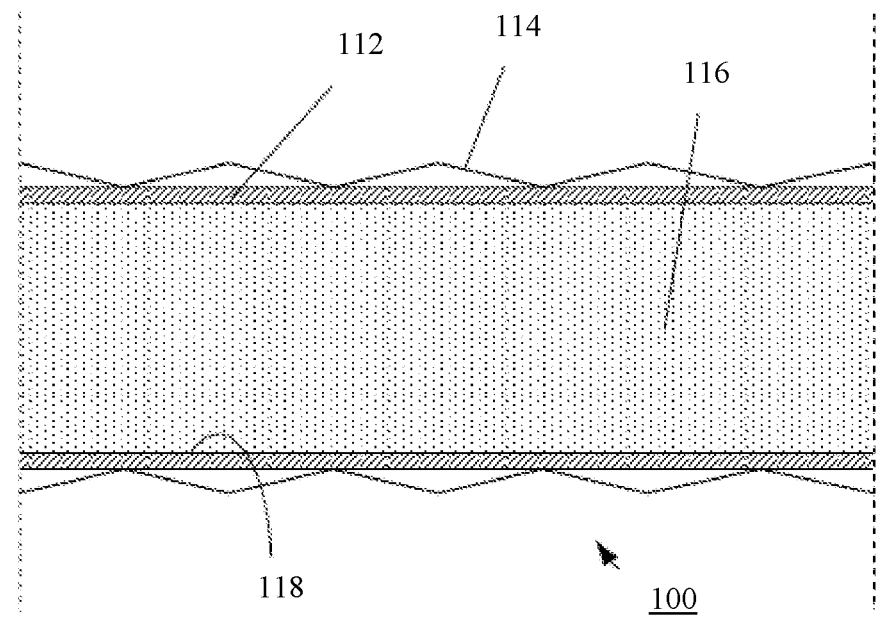
FIG. 8 shows a cross sectional view of the hose in an elongated state, according to the exemplary embodiment of FIG. 7.

Another exemplary embodiment of a hose that can be adapted to include hemp fibers embodied in at least a portion of the hose will now be explained with reference to FIGS. 7 and 8. FIG. 7 shows a cross sectional view of an exemplary hose 100 in a retracted state, and FIG. 8 shows the hose 100 in an elongated state, pressurized with fluid 116.

Hose 100 includes an inner fluid conductor (consisting of a layer of material) 112 and an outer jacket (or layer) 114. The inner fluid conductor (or layer) 112 may be made of an elastomer material [such as, for example, silicone rubber, thermoplastic elastomer, latex rubber, gum rubber or nitrile rubber] with hemp fibers optionally embedded therein to impart to the inner layer 112 the desirable properties of being moisture wicking, anti-microbial or anti-bacterial, mildew-resistant, odor reduction, etc.

The outer jacket 114 is not limited to any specific material and may include, for example, fabric (e.g., woven glass fibers, carbon fibers, aramid fibers, basalt fibers, flax, cotton, mixtures thereof, etc.) or plastic, with hemp fibers optionally embedded in, or selectively woven into, the fabric, to enhance tensile strength of the outer jacket 114 and render it more resistant to wear and tear.

The outer jacket 114 may be less stretchable relative to the inner fluid conductor 112, in a radial direction. However, the outer jacket 114 may be configured to stretch axially by a substantial distance. As one example, the material of the outer jacket 114 may include a fabric (woven as such or sewn into a tubular shape, for example), which is bunched up around the inner fluid conductor 112 when the hose 100 is in a retracted state and is fully or near fully un-bunched when the hose 100 is in an elongated state. As another example, outer jacket 114 may be a molded plastic accordion bellows.

Inner fluid conductor 112 and outer jacket 114 are unconnected along their lengths and are free to move with respect to each other, and thus there is substantial contact between these components during stretching, elongating and contracting of inner fluid conductor 112. Hemp fibers embedded in the inner fluid conductor 112 and/or the outer jacket 114 help it to have some wear resistance to preserve durability, particularly in comparison with an inner fluid conductor or outer jacket that does not employ hemp fibers at all. The hemp fibers also structurally enhance the strength and durability of the hose as a whole.

When pressurized fluid 116 is introduced into inner conduit 118 of the inner fluid conductor 112, a force exerted by the pressurized fluid 116 onto the inner conduit walls 118 acts to stretch the inner fluid conductor's circumference radially outward. The inner fluid conductor 112 enlarges radially as long as the pressure of the fluid is sufficient to overcome the resistance to stretching of the material of the inner fluid conductor 112. An inner fluid conductor 112 made of a stiffer material, for example, will exhibit less stretching than an inner fluid conductor made of a softer material when a fluid having the same pressure is introduced into both conductors. Eventually, the inner fluid conductor 112 stretches radially outward enough so that it receives resistance to further outward stretching from the outer jacket 114. The outer jacket 114 may be configured so as not to allow circumferential stretching of the inner fluid conductor 112 beyond a predetermined amount.

At the same time that the circumference of the inner fluid conductor 112 stretches outwardly, the inner fluid conductor 112 may also stretch in an axial direction. When the outer jacket 114 restricts further circumferential stretching of the inner fluid conductor 112, the pressure of the fluid 116 in the inner conduit 118 acts to stretch the inner fluid conductor 112 in an axial direction.

Other provisions or options which may be provided to or with a hose are disclosed in U.S. Pat. Nos. 9,709,194 and 10,174,870, the entire disclosure of each of which is incorporated by reference herein. For example, hose fittings may be provided at either or each end of a hose. In some exemplary embodiments, hemp fibers are dispersed throughout the material of the hose. On the other hand, since there is a tendency for greater wear and tear in some parts of the hose, hemp fibers may be dispersed or woven into the material of certain areas of the hose such that the density of hemp fibers in such areas is greater than that in remaining portions of the hose. In a preferred embodiment, the hose material at or near an interface between the hose end and the fittings preferably has hemp fibers embedded therein, to enhance it with the various advantages obtainable with hemp fibers.

The embodiments and examples discussed herein and shown in the attached drawings are merely illustrative, and many variations can be introduced to them without departing from the spirit of the disclosure. For example, elements and/or features of different illustrative and exemplary embodiments herein may be combined with each other and/or substituted with each other within the scope of the disclosure.

What is claimed is:

1. A hose configured to elongate when pressurized and to retract when pressure in the hose is decreased, the hose comprising plural layers of materials arranged concentrically one surrounding another, wherein hemp fibers are disposed in, or woven into, a material of at least a portion of an innermost layer amongst the plural layers of the hose.

2. The hose of claim 1, wherein the hemp fibers are disposed to render said at least a portion of the hose more resistant to wear and tear.

3. The hose of claim 1, wherein hemp fibers are dispersed in, or woven into a material of, some portions of the hose, and no hemp fibers are dispersed in, or woven into a material of, other portions of the hose.

4. The hose of claim 1, wherein a density of hemp fibers dispersed in, or woven into a material of, some portions of the hose is greater than that in other portions of the hose.

5. The hose of claim 1, wherein the hemp fibers are disposed in at least an elastomeric material of the innermost layer amongst the plural layers.

6. The hose of claim 1, wherein the hemp fibers impart an anti-microbial or anti-bacterial property to said at least a portion of the hose.

7. The hose of claim 1, wherein the hemp fibers reduce odor in the hose.

8. The hose of claim 1, wherein the hemp fibers impart a moisture wicking property to said at least a portion of the hose.

9. The hose of claim 1, wherein the hemp fibers are disposed in at least a material of an outer layer amongst the plural layers.

10. The hose of claim 1, wherein the hemp fibers enhance tensile strength of said at least a portion of the hose.

11. The hose of claim 1, wherein the hemp fibers are disposed in parts of the hose that are otherwise more susceptible to wear and tear.

* * * * *